Jan. 1, 1935.  L. A. WARNER  1,986,695
ELECTRICAL GOVERNOR
Filed April 14, 1932
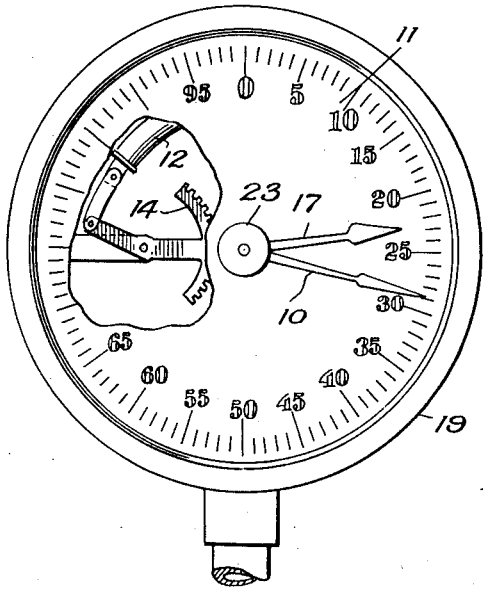
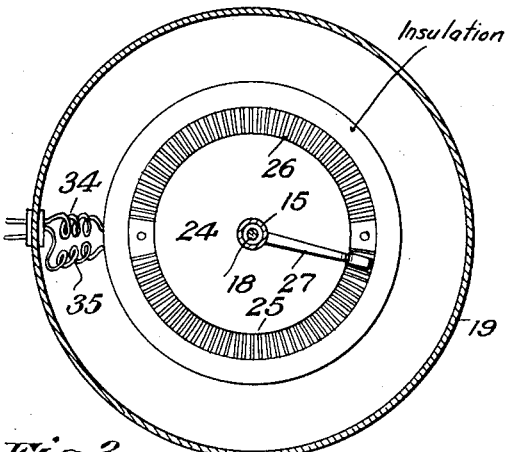
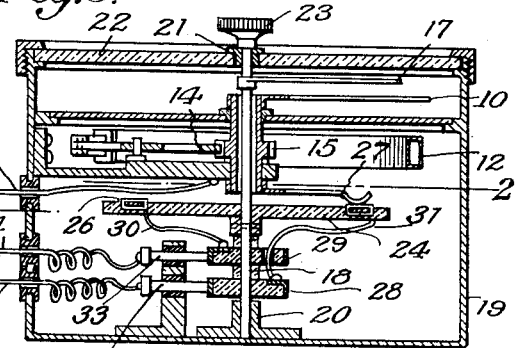
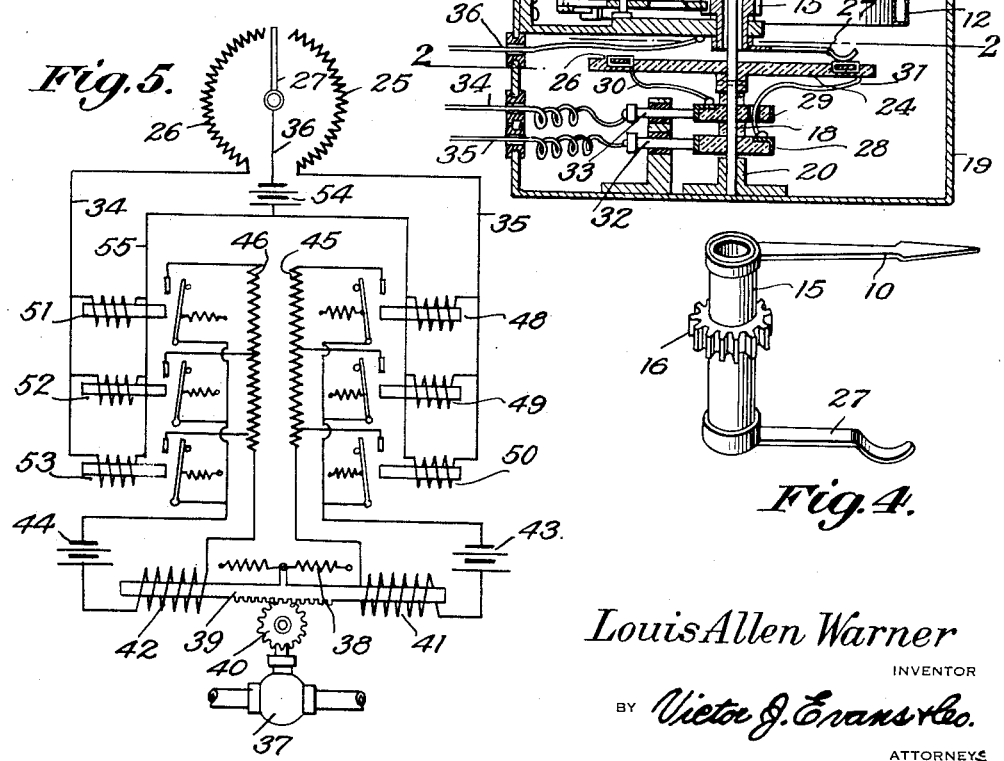
Louis Allen Warner
INVENTOR
BY Victor J. Evans & Co.
ATTORNEYS Patented Jan. 1, 1935

1,986,695

UNITED STATES PATENT OFFICE 1,986,695

ELECTRICAL GOVERNOR

Louis Allen Warner, Baltimore, Md.

Application April 14, 1932, Serial No. 605,344

2 Claims. (Cl. 201—48)

The object of the invention is to provide an electrical control device adapted to function as an automatic monitor or tell-tale, or electrical controller, or electrical safety device or as a graphic recorder in conjunction with various types of meters, gauges and various other measuring instruments utilizing a needle or movable indicator for indicating changes or variations in value in the system in which the device might be used; to provide a device of the kind indicated which may be set to maintain the desired condition in the system where it is employed and which will thereafter automatically function to maintain the condition by augmenting or reducing the supply as the requirements may necessitate; and generally to provide an electrical control device which is of simple form and susceptible of cheap manufacture.

With this object in view, the invention consists in a construction and combination of parts of which a preferred embodiment is illustrated in the accompanying drawing but to which embodiment the invention is not to be restricted. Actual reduction to practice may dictate certain changes or alterations and the right is claimed to make any falling within the scope of the annexed claims.

In the drawing:

Figure 1 is a front elevational view, partly broken away, of a device constructed in accordance with the invention.

Figure 2 is a horizontal sectional view on the plane indicated by the line 2—2 of Figure 3.

Figure 3 is a vertical diametrical sectional view.

Figure 4 is a perspective view of the system actuated indicator and associated contact member.

Figure 5 is a diagrammatic view of a system in which the invention is incorporated as a control.

While the instrument of which the invention is to be incorporated as a part may be a meter of any kind, the illustrated embodiment shows the instrument in the form of a steam gauge in which the indicator 10 moves over a dial 11 but by reason of the movement imparted thereto by a Bourdon tube 12 which is connected to a steam supply and which has an operative connection with the sector 14, so that change in the arc of the Bourdon tube as a result of the pressure therein, will be transformed into a rocking or swinging movement of the sector. The needle or indicator 10 is mounted at the upper end of a sleeve 15 at an intermediate point in the length of which there is provided a pinion 16 with which the sector 14 is in mesh. Thus, as the sector is rocked, the indicator is moved over the scale, in one direction or the other, depending on whether the tube 12 expands or contracts.

The movement of the needle or pointer 10 is intended to effect the operation of mechanism for effecting the change in condition in the system in which the device is used, as, for example, increasing or diminishing the steam supply and this is done in conjunction with a manually adjusted means which comprises a pointer or indicator 17, also movable over the scale 11 and preferably above the needle or indicator 10. The pointer or indicator 17 is mounted on a spindle 18 which is disposed vertically in the housing 19 in which the whole mechanism is enclosed, having a bearing 20 at the lower end and a second bearing 21 at the upper end and positioned at the center of a transparency 22. The spindle projects beyond the bearing 21 and receives on its projecting portion the knob 23 by which angular or turning movement may be imparted to the spindle by the fingers.

Below the scale, the spindle 21 carries a disk or table 24 inset in the upper face of which are the resistances 25 and 26, these being arranged in arcuate form with the spindle as the center of the arcs and these arcs being of an angular extent of substantially 180°. The resistances are of an angular extent slightly less than 180° to provide for them being separated at their extremities.

The resistances are traversed by a contact finger 27 carried by the sleeve 15 at the lower end of the latter. Thus, when the spindle is rotated through the instrumentality of the hand knob 23, the table is positioned to dispose the resistances in a certain location with reference to the scale and these will be traversed by the contact arm or finger 27 when the pointer or indicator 10 moves in response to any change in the condition in the Bourdon tube 12.

Since the resistances 25 and 26 are to be included in control circuits, the spindle 18 also carries the collector rings 28 and 29, mounted on the peripheries of appropriate insulating disks, one of these rings being connected to the resistance 26 at one extremity by means of a conductor 30 and the other being similarly connected to the other resistance by means of a conductor 31. Suitable brushes 32 and 33 bear upon the collector rings 28 and 29 respectively and have connected with them the conductors 34 and 35 which lead to suitable control circuits. A conductor 36 common to both circuits leads to the sleeve 15.

The spindle 18 passes centrally through the sleeve 15, so that both pointers or indicators move on a common center.

The pointer or indicator 17 is so positioned on the spindle 18 that its axis lies in a vertical plane passing mid-way between the adjacent ends of the resistances 25 and 26. Thus, when the spindle is adjusted to position the pointer or indicator 17 at a certain point on the scale 11, the resistances 25 are moved bodily around so that the diametrical line of the table 24 passing through the adjacent ends of the resistances is correspondingly positioned with reference to the dial. If the activity in the system under control is such that the pointer or indicator 10 will occupy the same position with reference to the scale 11 that is occupied by the indicator 17, the contact finger 27 will be disposed between adjacent ends of the resistances and the control circuit will be inactive. But let the condition in the system change, so that there is movement of the Bourdon tube 12. Then the sleeve 15 will be rotated and with it the indicator 10 and contact finger 27, the latter passing onto either the resistance 25 or the resistance 26, depending on whether the change in condition results in the pointer 10 being swung away or towards the zero point on the scale. Then the control circuit will be energized.

As an example of the use of the invention as a control medium, reference is had to Figure 5 in which a valve 37 is actuated in one direction or the other to effect a change either by augmentation or reduction in the control system. The neutral position of the valve is maintained by oppositely tensioned springs 38 and its operation in one direction or the other is effected through the instrumentality of a rack bar 39 in mesh with a gear 40 operating the movable element of the valve. The rack bar is influenced on the one side by a solenoid 41 when energized and on the other side by a solenoid 42. When both solenoids are de-energized, the springs 38 bring the valve to the neutral position and it is operated in one direction or the other by the energization of one or the other of the solenoids. The solenoid circuits are energized as by batteries 43 and 44 and their circuits include the resistances 45 and 46 and circuit closing relays 48, 49 and 50, and 51, 52 and 53. The magnets of the relays 48, 49 and 50 are connected in parallel on the conductor 35, while the magnets of the relays 51, 52 and 53 are connected in parallel on the conductor or wire 34. A battery 54 has one terminal connected to the conductor 36 and the other terminal connected to a conductor 55 which is common to the magnets of all of the relays from 48 to 53 inclusive.

The relays 48, 49 and 50, as well as the relays 51, 52 and 53, have their armatures retracted by springs and in the two sets, they are retracted, one with more force than the next, etc.

The pointer 17 having been set by hand to a position on the scale indicating the desired condition, if there shall be any change in the source of supply, the pointer 10 and its associated contact finger (the resistance carrying table having been moved with the pointer 17) will be moved, the contact finger wiping, say, the resistance 25. This will place the magnets of the relays 48, 49 and 50 in circuit and the armature of the first will be attracted because of its having the lighter spring and this will close the circuit on the solenoid 41 with all of the resistance 45 in circuit which will result in the minimum pull of the solenoid 41 and effect the minimum movement or operation of the valve 37. This of course assumes that the contact finger 27 moves onto the resistance just a short distance from the free end thereof, so that the resistance 25 is in circuit with the magnets on the relays 48, 49 and 50 and by cutting down in this manner the current flowing in the circuit, reduces the pull of the magnets. If the change in condition be such as to result in a comparatively great movement of the pointer 10, the finger 27 will be moved a distance to cut out a material part of the resistance 25, so that the magnets of the relays will function with greater intensity and thus be effective on the stronger springs of the armatures, so that all three armatures will be operated, or maybe only two, depending on the position of the finger on the resistance 25, and the pull of the solenoid 41 will be intensified by the greater current flowing in its circuit by reason of all or a part of the resistance 45 being cut out. If the change in condition of the system was such as to necessitate the operation of the valve 37 in the opposite direction, the pointer 10 would have swung in the opposite direction and thus carried the contact finger 27 onto the resistance 26, when the device would function in connection with the relays 51, 52 and 53 causing the solenoid 42 to operate in the same manner as explained with reference to the solenoid 41.

The invention having been described, what is claimed as new and useful is:

1. A device for the purpose indicated comprising a shaft, a disk mounted upon and secured to said shaft, manual means for imparting angular or turning movement to said shaft, collector rings carried by said shaft for electrical connection each to one terminal of a plurality of parallel circuits, resistances mounted on one face of said disk and terminally spaced with one terminal of each connected to each one of the collector rings, a sleeve rotatably mounted on said shaft, automatic means for imparting angular or turning movement to said sleeve, and an arm carried by the sleeve and wiping the resistances.

2. A device for the purpose indicated comprising a shaft, a disk mounted upon and secured to said shaft, manual means for imparting angular or turning movement to said shaft, collector rings carried by said shaft for electrical connection each to one terminal of a plurality of parallel circuits, resistances mounted on one face of said disk and terminally spaced with one terminal of each connected to each one of the collector rings, a sleeve rotatably mounted on said shaft, a Bourdon tube operatively connected with the sleeve, and an arm carried by the sleeve and wiping the resistances.

LOUIS ALLEN WARNER.